United States Patent [19]

Bayless et al.

[11] 3,726,803

[45] Apr. 10, 1973

[54] CAPSULE WALL TREATING PROCESS UTILIZING CONDENSATION POLYMERIZATION AND CAPSULE PRODUCT

[75] Inventors: Robert G. Bayless, Yellow Springs; Donald D. Emrick, Kettering, both of Ohio

[73] Assignee: The National Cash Register Company, Dayton, Ohio

[22] Filed: Feb. 16, 1970

[21] Appl. No.: 11,882

Related U.S. Application Data

[63] Continuation-in-part of Ser. No. 701,124, Jan. 29, 1968, abandoned.

[52] U.S. Cl.................252/316, 44/7 R, 71/64 F, 99/166, 106/308 Q, 117/62.2, 117/100 A, 117/100 B, 117/100 M, 252/62.54, 264/4, 424/32, 424/33, 424/34, 424/35, 424/37
[51] Int. Cl.........B01j 13/02, B44d 1/02, B44d 1/44
[58] Field of Search.................252/316; 117/100 A, 117/62.2; 264/4; 424/32, 33, 34, 35, 37

[56] References Cited

UNITED STATES PATENTS

| 2,557,826 | 6/1951 | Keaton et al. | 117/62.2 X |
| 2,800,457 | 7/1957 | Green et al. | 252/316 |
| 2,889,252 | 6/1959 | Valentine et al. | 424/37 |
| 3,080,318 | 3/1963 | Claus | 117/100 X |

Primary Examiner—Richard D. Lovering
Attorney—Robert J. Shafer

[57] ABSTRACT

A method is provided for treating existing liquid-permeated, capsule walls, en masse, wherein one component of a capsule wall treatment system comprising at least two components is held within the capsule wall material permeation pathways by being chemically complexed or otherwise bound therein and remaining components are infused into the capsule wall material by permeation, in liquid solution, to achieve reactive proximity to said chemically complexed or otherwise bound component. The complexed component and the remaining components are mutually co-reactive to form new polymeric material of a kind differing from the existing wall material and such new polymeric material is produced interstitially or internally within the structure of the existing capsule walls to provide a novel capsule wall composition comprising a composite or intimate association of different kinds of polymeric materials.

6 Claims, No Drawings

CAPSULE WALL TREATING PROCESS UTILIZING CONDENSATION POLYMERIZATION AND CAPSULE PRODUCT

CROSS-REFERENCE TO RELATED PATENT APPLICATIONS

This is a continuation-in-part of application for United States Letters Patent Ser. No. 701,124, filed Jan. 29, 1968 now abandoned.

BACKGROUND OF THE INVENTION

Field of the Invention

This invention relates to a method for treatment, en masse, of liquid-permeated, existing polymeric material, capsule walls wherein, during the treatment, at least one component of a capsule wall treatment system is bound within the capsule wall material permeation pathways by being chemically complexed or otherwise bound thereto and remaining components are introduced into the capsule wall material during treatment by permeation in liquid solution through the "-ways". The several components thereby achieve reactivity proximity to form a polymeric material intercombined with, or intimately associated with and complementary to, the original, existing capsule wall material. The invention more specifically pertains, in one embodiment, to such a capsule wall treatment and consequent composite capsule wall formation wherein the chemically complexed or preferentially sorbed component is a polyhydroxy aromatic material and the polymeric material formed by the treatment reaction is the product of a polycondensation reaction.

An important aspect of the subject capsule wall-treatment process resides in the discovery that if one component of a polymerizing system of components is bound to a swollen matrix of preformed capsule wall material prior to polymerization of the system of components of the treatment system, then polymerized material produced by the polymerizing system of components will be concentrated and substantially localized within the swollen matrix.

Description of the Prior Art

Prior work performed in the encapsulation art which is somewhat related to the process of this invention, falls into two general categories: (1) Encapsulation of materials by two or more separate and distinct concentric capsule walls and; (2) Infusion, into swollen capsule walls, of a solution of "filler" material. Both of the above categories contain processes intended to establish a reinforced, physical, capsule wall barrier effective to hinder permeation of matter through the resulting capsule walls.

United States Pat. No. 2,969,331, which issued Jan. 24, 1961, on the application of Carl Brynko and Joseph Scarpelli and which was assigned to the assignee herein, teaches the manufacture of concentrically dual-walled capsules which contain a core of water-immiscible liquid. The inner wall of the dual-wall capsule structure is prepared in one instance, by causing an interfacial polymerization reaction to occur at the interface between an agitated manufacturing vehicle containing a first reactive component for the interfacial polymerization and dispersed droplets of intended capsule core material containing a second reactive component for interfacial polymerization. The inner capsule wall is formed due to the ability of the two reactive components to diffuse through the liquid capsule-internal-phase and the liquid capsule-manufacturing-vehicle to meet and react at the interface therebetween. Once an initial film of interfacially formed polymeric capsule wall is present, the reactive components must, of course, diffuse through that film also; but only to the purpose of thickening the film by formation of more of the same kind of polymeric material. Thickening of a capsule wall is not related to the present invention of forming a new polymeric material intercombined with an existing capsule wall of polymeric material. The outer capsule wall is that of a hydrophilic polymeric material deposited by techniques of complex liquid-liquid phase separation which will be explained hereinbelow in "Description of Preferred Embodiments".

In United States Pat. No. 3,137,631, issued June 16, 1964, on the application of Saul Soloway, capsules were disclosed having walls of denatured protein material and in-situ-polymerized polymeric material. Although Soloway utilized, in some embodiments, an aldehyde material to serve a double purpose of cross-linking the denatured protein and contributing to the formation of the polymerizing polymeric material, he did not utilize polymerizable materials which were designed to penetrate the interior of the existing wall there to complex with it and remain in available condition chemically to combine by polycondensation with the later introduced reactant, thus concentrating or localizing the in-situ formed polymeric material within the material of existing capsule walls previously deposited to form individual, separate, capsules containing particles of capsule internal phase.

United States Patent Application Ser. No. 555,179, filed June 6, 1966, and now U.S. Pat. No. 3,623,997, in the name of Thomas Powell and assigned to the assignee herein, teaches infusion of a solution of wax into solvent-swollen capsule walls to seal the capsule walls against loss or alteration of the capsule contents by diffusion of the contents through the capsule walls after the wall-swelling solvent has been removed. The capsule wall material is, in the above Powell invention, water insoluble (hydrophobic) polymeric material, such as ethyl cellulose, and the capsule wall-swelling liquid is a water immiscible, organic solvent such as cyclohexane. In general, the wax sealing material is believed to be "locked" into the capsule wall structure by physical forces exerted due to shrinkage of the polymeric material in the capsule wall material when the wall-swelling solvent is evaporated.

In another United States Pat. No. 3,520,821, issued July 21, 1970 in names of David Striley and James Williams and assigned to the assignee herein — a method is taught for sealing water-swollen, hydrophilic capsule walls. The capsule wall sealing technique of the above Striley and Williams invention is similar to the aforementioned technique of Powell but is performed in an aqueous system and uses a polyhydric compound such as sucrose as the sealing material. It is thought that, although adsorption forces play a role in the above-mentioned sealing system, the polyhydric materials serve as physical "plug" to effusion of material through microscopic pores in the capsule walls.

Although not prior art, United States Patent Application, Ser. No. 701,126, filed Jam. 29, 1963, and now U.S. Pat. No. 3,630,955, in the name of Donald Emrick, one of the inventors herein, and assigned to the assignee herein, teaches a method for providing polymeric capsule-wall-sealing material interstitially or internally within the swollen material of a preformed capsule wall. The interstitial capsule-wall-sealing material of that Emrick patent application is formed by a free-radical polymerization reaction wherein certain transition metal ions are used to provide graft or nucleated polymerization sites to chemically graft or bind the newly-formed polymeric material to the preformed capsule walls. The present invention does not employ graft or nucleated polymerization, but polycondensation. Predetermination that the polycondensation product will exist within the existing capsule wall because one of the reactants is securely complexed thereto beforehand and is immovable therefrom by diffusion, forms the conception of and means for carrying into effect the treatment of the existing capsule walls which makes this an invention over the prior art.

SUMMARY OF THE INVENTION

The problem of sealing capsule walls against undesired loss of contents by diffusion through the capsule walls is a difficulty of long-standing. The novel process of this invention represents a distince advance over the prior art in several respects. It is believed that the novel process provides a capsule wall of decreased permeability to diffusion of contained materials without resort to a laminate of concentric capsule wall layers. It is believed that the novel process provides a highly impermeable capsule wall having less thickness than would be required for a laminate capsule wall having the same high degree of impermeability. The novel process results in capsule walls which are hydrophobic, insoluble, and substantially unswellable in liquids which either dissolve or swell the capsule wall material before treatment by the process of this invention. The novel process greatly simplifies the, heretofore rather complex and expensive, post-capsule-manufacturing steps — those steps of isolating the capsules from a manufacturing vehicle and drying the capsule walls. The novel process results in a capsule wall which is an apparently molecularly interspersed composite of polymeric material which is produced in-situ interstitially in combination with the structure of an original hydrophilic polymeric capsule wall material.

An object of this invention is to provide a method for the enn masse treatment of existing, liquid-permeable, hydrophillic capsule wall material wherein the resultant capsule walls show increased resistance to liquid permeation. A further object of this invention is to provide such a method for capsule wall treatment wherein said treatment consists of causing a polycondensation-type of polymerization reaction to occur interstitially or internally within the structure of existing capsule wall material, said capsule wall material having a hydroxyl-containing component of the polymerization reaction chemicaly complexed therein.

The realization that in-situ condensation polymerization can be performed in concentrated or localized volumes in a liquid-dispersed system, that is, within each of a plurality of matrices of swollen polymeric material, which volumes are dispersed in a liquid manufacturing vehicle represents a foundation on which the present invention is believed to rest. It has been found that when at least one reactive component essential to the condensation polymerization is bound by being complexed or sorbed to the polymeric matrix material, the product of the condensation polymerization which is subsequently performed will be confined and thus concentrated within the polymeric matrix material. For the purposes of this invention, the matrices are the solvent-swollen capsule walls of hydrophilic polymeric material. The process for performing the above-described condensation polymerization and the hydrophobic capsule product of such a process are the features of this invention which are considered to be patentable.

The novel process of this invention, stated broadly, includes the steps of: (a) providing, for treatment, capsules whose gelled or solid, liquid-permeable, walls have complexed or otherwise contained within the material constituting them, at least one reactant material necessary for a polycondensation-type of polymerization reaction; (b) infusing into the wall material of the so-provided capsules, by diffusion through the liquid-permeating capsule walls, other reactant materials which are reactant polymeric-material-precursors essential to the desired polycondensation reaction; and (c) condensation-polymerizing the reaction components to create a solid matrix of polymeric material within the molecular interstices, or internal macromolecular structure of the matrix (capsule wall) to be treated.

With the foregoing discussion and objects of the invention in mind, the invention will now be explained in detail, from which detailed explanation and the appended claims further objects and features of the invention will become apparent to those skilled in the art.

The process of this invention is intended to be performed on existing capsule wall material which is in a liquid-permeated state and dispersed in a liquid vehicle. The process is usually, but not always, carried out in an aqueous treatment vehicle on capsule wall materials which are of the hydrophilic, polymeric variety. Core material retained by the capsule walls, i.e., the capsule internal phase, is relatively unimportant to practice of the invention and can be any material capable of being encapsulated by commonly known techniques such as those described in United States Pat. No. 2,800,457, and 2,800,458 issued July 23, 1957 in the names of Barrett Green and Lowell Schleicher, and Barrett Green, respectively, or in United States Pat. No. 3,190,337 issued June 22, 1965 in the names of Carl Brynko and Joseph Scarpelli — all assigned to the assignee herein. A few of the materials which can be utilized as capsule internal phases include, among a multitude of others: water insoluble or substantially water insoluble liquids and solids, such as olive oil, fish oils, vegetable oils, sperm oil, mineral oil, xylene, toluene, benzene, kerosene, chlorinated biphenyl, methyl salicylate, iron oxide, metal powder, inorganic and organic water insoluble pigments, minerals and chemical compounds. In short, the core materials which can be contained in a batch of capsules to be treated can differ not only among themselves in their physical state, which can be solid, liquid, gas, or combinations thereof, but can differ in their chemical composition and intended use. Of the classes of such liquid and solid core materials, among many others can be mentioned: foods, fuels, dyes, chemical reactants, magnetic materials, perfumes of flavoring substances, reactants, biocidal compositions, physiological compositions, fertilizer compositions, and the like.

The present invention utilizes condensation-polymerization of eligible polyhydroxy aromatic materials and aldehydic materials in an aqueous or polar manufacturing vehicle. The condensation-polymerization product is substantially insoluble in the manufacturing vehicle and exhibits a low degree of liquid permeability as a capsule wall constituent, particularly when it is present in combination with existing polymeric capsule wall material. Polyhydroxy aromatic materials for use in this invention can be chosen according to their capability to: (a) dissolve in the manufacturing vehicle; (b) complex with or be preferentially sorbed by the capsule wall material to be treated; and (c) react with certain aldehydic materials to yield a polymeric reaction product insoluble in the manufacturing vehicle.

Phenolic or polyhydroxy aromatic materials which are eligible for use in practice of this invention include: resorcinol, hydroquinone, catechol, phloroglucinol, pyrogallol, guaiacol, gallic acid, digallic acid, tannic acid, cresols, chlorophenols, xylenols, eugenol, isoeugenol, saligenin, thymol, hydroxyacetophenone, hydroxybiphenyls, Bisphenol A, cashew nut oil phenols, and the like. Resorcinol is preferred because it is readily soluble in aqueous and other polar media, is readily complexed by or preferentially sorbed by many hydrophillic macromolecules and readily reacts with aldehydes to yield a resin which cures at relatively low temperatures to procuce a relatively water-insensitive film. Examples of aldehydic materials suitable for practice of this invention include: formaldehyde, glyoxal, furfural, glutaraldehyde, and the like.

The interstitial condensation polymerization reaction of this invention is conducted in a polar-liquid vehicle and it can be promoted or controlled by such factors as: (a) adjustment of pH of the vehicle, (b) salt concentration or ionic strength of the vehicle, (c) concentrations of the reactive components in the vehicle, (d) ratio of polyhydroxy aromatic material to aldehydric material in the vehicle, (e) temperature of the vehicle, and (f) duration allowed for complexing of the polyhydroxy aromatic material with the capsule wall material. Duration allowed for the polymerization reaction itself also influences the degree of condensation-polymerization, of course. Varying degrees of condensation-polymerization can be utilized to provide treated capsule walls with varying degrees of hydrophobicity or resistance to swelling in contact with polar liquids. Partial treatment of capsule wall material can be used to provide capsules having a certain degree of swellability or resistance to liquid permeation through the capsule walls, thereby permittig manufacture of capsules which exhibit sustained or controlled release of their contents when placed in a polar liquid. As an example of preferred condensation-polymeriiation conditions, in a system utilizing resorcinol and formaldehyde as the reacting materials, most satisfactory results are obtained if the pH of the vehicle is below about 3 and if the system temperature is between about 0° C and 100° C — a pH of less than 2 and a temperature in the range of 15° to 45° C being preferred. In treating capsule walls by the process of this invention, it has been found most often desirable to perform the treatment such that the complicated, dry, treated capsule wall material consists of about 30 to 90 per cent, by weight, condensation polymerization product — the remaining capsule wall material being the original, preformed, capsule wall within which the condensation polymerization was performed. On a basis of 1 gram of dry, treated, capsule wall material, and assuming the use of resorcinol and formaldehyde as components of the condensation polymerization reaction, approximately 0.2 to 0.45 grams each of resorcinol and formaldehyde are reacted together within a matrix of 0.7 to 0.1 gram of the original capsule wall material to provide the treated capsule walls of this invention. Of course, it must be understood that lesser amounts of the polymerizing components can be used in practicing the invention to obtain treated capsule walls having a lesser amount of the polymerization product. It must also be understood that a portion of the condensation polymerization product is usually produced outside the confines of the original, capsule wall material and for this reason, an excess of reactive components is usually utilized in treating the capsule wall material. For example, in the instance of resorcinol and formaldehyde as reactive components, amounts of the components can be varied from about 0.1 gram to about 3 grams of each reactive component to produce 1 gram of dry, treated capsule wall material. When other reactive condensation polymerization components are substituted for resorcinol and/or formaldehyde, the amounts to be used in capsule wall material treatment are adjusted according to differences between the molecular weight and reactive functionality of the corresponding reactive components. Such adjustments are made by methods well-known to those skilled in the art of chemistry. Moreover, in systems for practicing this invention which utilize materials other than resorcinol and formaldehyde, the above-preferred conditions of acid pH and moderate temperature may not be optimum.

Materials from which the existing capsule walls can be made can be any polymeric materials which are capable of complexing with the polyhydroxy aromatic or phenolic materials of this invention and any other materials which can be used in combination with said polymeric materials capable of complexing. Examples of such materials include: unmodified acid- or alkali-precursor gelatins; modified gelatins such as succinylated gelatin; gum arabic; carrageenan; hydrolyzed poly(methylvinylether-co-maleic anhydride); hydrolyzed poly(ethylvinyl-ether-co-maleic anhydride); poly(vinyl alcohol); poly(vinylpyrrolidone); poly(acrylic acid) and its salts; poly(methacrylic acid) and its salts; hydrolyzed poly(ethylene-co-maleic anhydride); hydrolyzed poly(styrene co-maleic anhydride); melamine/formaldehyde resin, cationic starch, poly(ethylene oxide), methylated methylol melamine, and the like. Poly(vinyl alcohol) capsule wall material for treatment by this invention is disclosed in U.S. Pat. Applications Ser. No. 701,127 and Ser. No. 701,123, filed on Jan. 29, 1969, said Ser. No. 701,127 having issued as U.S. Pat. No. 3,574,133 and said Ser. No. 701,128 having been abandoned, in the names of Robert G. Bayless and Donald D. Emrick, and Robert G. Bayless, respectively, the inventors herein, and assigned to the assignee herein.

Capsules made by the process of this invention are substantially spherical and can have diameters from about one-micron to several thousand microns. The size of capsules made by this invention is, in fact, limited only by the size of the existing capsules which can be supplied, by other methods, for treatment by this invention. The capsule product of this invention can be made to take the form either of individual capsules with each capsule having, as an internal phase, one particle of capsule core material or of aggregates of individual capsules with each aggregate having several particles of capsule core material. Capsule aggregates can be made in sizes from a few microns in diameter to several thousand microns in diameter depending upon the size and number of individual capsule core particles included in each aggregate. It should be understood that the treated capsules need not have dried walls or even be separated from a liquid vehicle prior to their use. If it is desired or required for some intended purpose, the capsule product of this invention can be supplied as a slurry of capsules in a liquid carrier, either the manufacturing vehicle or not, as for use in a paper-coating composition, a paint, an insecticide composition, or the like — such uses being well-known and obvious to persons skilled in the pertinent arts.

DESCRIPTION OF PREFERRED EMBODIMENTS

Example 1.

In this example, capsules having existing walls of a complex of gelatin and carrageenan were treated, using the process of this invention, to yield capsule walls having a substantially homogeneous composite of the existing capsule wall material and a resorcinol/formaldehyde polymeric material.

Into a vessel having a capacity of approximately 1,500 milliliters and equipped for agitation and heating were placed about 150 milliliters of 10 per cent, by weight, aqueous gelatin solution (the gelatin of this example was characterized by being of the acid-precursor, pigskin type having an isoelectric point of about pH 8 to 9 and having a Bloom strength of about 285 to 305 grams), 475 milliliters of water, and 130 milliliters of toluene. This mixture was warmed to about 55° C, the pH was adjusted to about 6.4 and the agitation was adjusted to yield a dispersion of toluene particles having diameters of about 500 microns. To this agitating, warmed system was added 240 milliliters of 0.5 per cent, by weight, aqueous carrageenan solution over a duration of about 15 minutes. The carrageenan used in this example was designated as "Viscarin 402" by Marine Colloids, Incorporated, New York, N.Y., United States of America During addition of the carrageenan solution, the particles of toluene were individually enwrapped due to formation of a separated liquid phase of gelatin/carrageenan complex to form liquid-walled capsules. The pH of the system was readjusted to 6.4 and the system was cooled to about 25 degrees centigrade over a duration of about 2 hours after which the system was chilled to about 10° C in an ice bath. The pH of the system was then adjusted to about 4.5 using 14 per cent, by weight, aqueous acetic acid solution and 7.5 milliliters of 25 per cent, by weight, aqueous pentanedial solution (commonly known as glutaldehyde) was added to the system to chemically cross-link the capsule wall material. The capsule-containing system was agitated overnight (12 to 16 hours) to complete the chemical cross-linking reaction.

The present invention is practiced on capsule walls which have been water-swollen and the above-prepared capsules could have been treated by the process of this invention as a next step in their manufacture. However, in order to demonstrate that reswollen capsule walls can also be treated by this invention, the above-prepared capsules were separated from the liquid manufacturing vehicle by filtration and the capsule walls were dried by tumbling the capsules in a forced air dryer together with granulated cork used as a drying aid. Ten grams of the dried, rigid-walled, toluene-containing, capsules were dispersed in 250 milliliters of water and the dispersion was agitated for about 20 minutes to fully resweil the capsule walls. Then, 30 milliliters of 10 per cent, by weight, aqueous resorcinol solution, and 15 milliliters of 37 per cent, by weight, formaldehyde solution were added, in succession, to the agitating system. Agitation of the system was continued for about 4 hours while maintaining the temperature of the system at about 25° to 30° C. The polymer which thereupon formed, pervaded the swollen walls. The capsules, now having rigid walls of a composite of resorcinol/formaldehyde condensation polymerization product combined with the gelatin/carrageenan complex, were separated from the liquid vehicle in which they were treated and were washed several times by immersing them in water. They were then separated from the water by filtration and the capsule walls were dried into individual, rigid-walled, capsules by spreading them onto an absorbent surface in ambient laboratory conditions (about 25° C and about 50 per cent relative humidity) until dry. The resultant, apparently dry, capsule product released toluene when ruptured. Walls of the capsules treated in the above example exhibited no tendency to swell when they were redispersed in water.

Example 2

In this example, liquid-liquid phase separation of a gelatin/resorcinol complex was accomplished by use of aqueous sodium sulfate solution.

Into a vessel having a capacity of approximately 1,500 milliliters and equipped for agitation and heating were placed 400 milliliters of 11 per cent, by weight, aqueous gelatin solution (the same kind of gelatin as specified in Example 1, above), 200 milliliters of 5 per cent, by weight, aqueous resorcinol solution, and 200 milliliters of tetrachloroethylene (the capsule internal phase for this example) — all of the above materials being warmed to about 45° C. Agitation was adjusted to yield tetrachloroethylene particles having diameters of 100 to 300 microns and then 200 milliliters of warmed, 20 per cent, by weight, aqueous sodium sulfate solution was added to the agitating system in a dropwise fashion. The sodium sulfate solution caused liquid-liquid phase separation and the dispersed particles of capsule internal phase were enwrapped by the separated liquid phase to form liquid-walled capsules. The system was cooled to about 25° C to gel the capsule walls and 80 milliliters of 7 per cent, by weight, formaldehyde solution was added. After about 5 minutes, 100 milliliters of approximately 15 per cent, by weight, aqueous sulfuric acid solution was slowly added to lower the pH of the system to below 1.2. The condensation polymerization reaction was permitted to proceed during 4 hours of agitation at a temperature of about 25° C and then 1 hour of agitation at a temperature of about 45° C to produce rigid-walled capsules having, as capsule wall material, a substantially homogeneous interspersion of gelatin and resorcinol/formaldehyde condensation polymerization product. The capsules were separated from the dispersing liquid by filtration and, after being washed several times with water, were spread onto an absorbent surface to dry in ambient laboratory conditions (about 25° C and about 50 per cent relative humidity).

Example 3

In this example, three individual capsule preparations were treated by the process of the present invention. Treated capsules from each of the three preparations in this example had existing walls comprising succinylated gelatin which was interstitially combined, in the treatment, with resorcinol/formaldehyde condensation polymerization product. The three kinds of existing capsules are identified in (a), (b), and (c) which follow. Those capsules in (a) and (b) have walls of succinylated gelatin, those of (b) having been shrunken, and the capsules in (c) having walls of succinylated gelatin/resorcinol complex.

a. Into a vessel having a capacity of about 1,500 milliliters were placed 500 milliliters of an 8 per cent, by weight, aqueous solution of succinylated gelatin (such as the gelatin product designated "Type 2001" and sold by Kind and Knox Gelatin Company, Camden, N.J., United States of America and approximately 200 milliliters of 20 per cent, by weight, aqueous sodium sulfate solution. The solution was warmed to a temperature above about 40° C and the pH was adjusted to 4.3 with aqueous acetic acid solution to provide an optimum degree of liquid-liquid phase separation. Two hundred milliliters of toluene (the capsule internal phase for this example) were adddded to the system and the agitation was adjusted to yield particles of toluene 500 to 1,000 microns in diameter. The agitating system was cooled to a temperature of about 25° C to provide swollen-walled capsules containing toluene — most of the liquid-liquid phase separated capsule wall material being deposited on the toluene particles when the temperature of the system was about 33° C. The system was then further chilled to a temperature of approximately 5° C and the chilled capsules were separated from liquid in the system in a swollen condition.

About 25 grams of the above-prepared, chilled, swollen-walled capsules were dispersed in about 1,000 milliliters of cold water (approximately 10° C) and 200 milliliters of 10 per cent, by weight, aqueous sulfuric acid solution was added to the dispersion. After about 10 minutes, 200 milliliters of 5 per cent, by weight, aqueous resorcinol solution was added, followed by 60 milliliters of 37 per cent, by weight, formaldehyde solution 10 minutes later. The resulting dispersion of capsules in capsule manufacturing liquid was agitated for 2 hours at a temperature of about 5° C and for about 20 hours at a temperature of about 25° C in order to permit the condensation polymerization to proceed to completion. The system, after completion of the condensation polymeriation, was slightly contaminated by small pieces of resorcinol/formaldehyde polymerization product which had not been adhered within the structure or the capsule walls. The treated, rigid-walled capsules and the non-adherent pieces of polymerization product were separated from the manufacturing liquid by filtration and were washed several times with water. The capsules were dried and separated form the non-adherent pieces of polymeric material by use of a forced air dryer. The treated capsule wall material would not swell when immersed in water.

b. This capsule preparation was conducted by substantially the same procedure as the preparation of (a), above, except that in this capsule preparation, an additional 800 milliliters of 20 per cent, by weight, aqueous sodium sulfate solution was added to the dispersion of capsules in an added step immediately after the system was chilled. The additional sodium sulfate solution served to shrink the capsule walls and provide a closer-knit structure in which to perform the condensation polymerization treatment of this invention. The capsules were separated from the excess sodium sulfate solution by decanting the manufacturing liquid and approximately 70 per cent, by volume, of the resulting concentrated, capsule slurry was dispersed in 3,000 milliliters of cold water (about 5° C). After about 15 minutes of agitation, 600 milliliters of cold 10 per cent, by weight, aqueous sulfuric acid solution was added followed by addition of 200 milliliters of cold 15 per cent, by weight, aqueous resorcinol solution 10 minutes later and 180 milliliters of cold 37 per cent, by weight, formaldehyde solution 10 minutes after that. The system was permitted to warm to a temperature of about 25° C and was agitated overnight (about 17 hours). The system containing the treated capsule product of this, (b), part of this example did not have contaminant, non-adhering, pieces of polymeric material associated with it as did the system of preceding part (a) of this example. It should be remembered that, in this part (b), additional sodium sulfate solution was utilized to provide a more closely-knit capsule wall for treatment. Although the treated capsule products of preceding part (a) and this part (b) were both satisfactory, it has been found to be helpful in some capsule wall treatments to provide means for additional capsule wall shrinkage (as in this part (b)) in order to assure maximum growth of the condensation polymerization product within the material of the preformed capsule wall.

c. This capsule wall preparation utilized as capsule wall material, a complex of succinylated gelatin and resorcinol.

Into a vessel having 1,500 milliliter capacity and equipped for agitation and heating were placed 500 milliliters of an 8 per cent, by weight, aqueous succinylated gelatin solution (the gelatin being of the same kind as that specified in part (a) of this example) and approximately 170 milliliters of a 6 per cent, by weight, aqueous solution of resorcinol. The system was warmed to about 55° C and after about 10 minutes of agitation, 110 milliliters of warm 10 per cent, by weight, aqueous sodium sulfate solution was added to rpomote liquid-liquid phase separation. The system was then permitted to cool to about 45° C and 200 milliliters of toluene was added to serve as the capsule internal phase for this example. The agitation was adjusted to provide particles of toluene having diameters of 30 to 100 microns and the system was slowly cooled to about 25° C to cause encapsulation of the dispersed toluene particles by the liquid, separated, complex, wall material. The system was then chilled to a temperature of about 5° C and the agitating, capsule-containing, system was utilized in the condensation polymerization capsule wall treatment described below.

The above chilled system was added to 4,000 milliliters of cold water to form a dispersion, and about 1,200 milliliters of 10 per cent, by weight, aqueous sulfuric acid solution was added to the dispersion to lower the pH to about 1.2. Twenty grams of solid resorcinol was added to the agitating dispersion; and after the resorcinol was dissolved, 180 milliliters of cold 37 per cent, by weight, formaldehyde solution was added. The resultant dispersion was agitated overnight (about 16 hours) and was permitted to gradually warm to a temperature of about 25° C during that time. The capsule product of this treatment was isolated from the liquid in which it was dispersed by decanting, was washed several times by immersing the capsules in water and was dried by spreading the capsules onto an absorbent surface in ambient laboratory conditions (absut 25°q0 C. and about 50 per cent relative humidity)/. The treated capsule walls would not swell when immersed in water.

Example 4 qpp In this example, the capsule wall material which was treated consisted essentially of a complex combination of gelatin and gurn arabic. qp Into a vessel having a capacity of approximately 2000 milliliters and equipped for agitation and heating were placed 180 milliliters of 11 per cent, by weight, aqueous gelatin solution (the same kind of gelatin as was specified in Example 1, above), 180 milliliters of 11 ql per cent, by weight, aqueous gum arabic solution and 700 milliters of water. Agitation was begun, the system was warmed to a temperature of about 40q20 q0 ql C and the pH of the system was adjusted to 4.5 using 10 per cent, by weight, aqueous acetic acid. About 160 milliliters of carbon tetrachloride were then added to the agitating system to serve as the capsule internal phase for this example and the agitation was adjusted to yield particles of the carbon tetrachloride having diameters of 100 ql to qb 500 microns. Liquid-liquid phase separation had occurred at the time that the gelatin and gun arabic solutions were combined and the separated liquid phase which contained substantially all of the gelatin and gum arabic was caused to deposit onto the dispersed particles of carbon tetrachloride by slowly cooling the system to a temperature of about 25° C. The agitating system, now containing capsules, was chilled in an ice bath to a temperature of about qb 10° centigrade and 10 milliliters of 25 per cent, by weight, aqueous pentanedial (commonly known as glutaraldehyde) was added to chemically cross-link the capsule wall material. After agitating the system for about 14 to 16 hours. the capsules, now having chemically cross-linked capsule walls, were separated from the liquid in the system by decanting and the capsules were washed several times by immersing them in cold water.

The slurry containing the above-washed capsules was placed in a vessel having a capacity of about 1,500 ql milliliters and equipped for agitation and 400 milliliters of qb 5 per cent, by weight, aqueous resorcinol was added with agitation. After about 30 minutes, concentrated sulfuric acid was added to the agitating system until a pH of 0.5 ql was attained and then 120 milliliters of 37 per cent, by weight, formaldehyde solution was added. Agitation was maintained overnight (14 to 16 hours) and then the capsules, now having capsule walls of a substantially homogeneous composite of materials including the gelatin complex interspersed with the product of condensation polymerization between resorcinol and formaldehyde, were separated from the liquid by decanting. The capsules were washed several times by immersing them in water and the capsule walls were dried by spreading the capsules onto an absorbent surface in ambient laboratory conditions (about 25° ql C and about 50 per cent relative humidity). The treated capsule product of this example was similar, in appearance and physical characteristics, to the capsule products of preceding example, except, of course, that the capsules of this example released carbon tetrachloride when ruptured.

Example 5

In this example, five individual capsule preparations were treated by the process of the present invention. Capsules from each of the five preparations in this example had walls comprising a complex of gelatin, gum arabic, and negatively charged synthetic polymeric material which complex was interstitially combined with polyhydroxy aromatic material/formaldehyde condensation polymerization product. Resorcinol, hydroquinone and catechol were used in the individual preparations as the polyhudroxy aromatic materials of (a), (b), and (c) to follow and (d) is like (a) but with the capsule walls hardened by a different co mpound (vanadium) and (c) is like (a) with the capsules having different contents.

a. Into a vessel a capacity of about 2,000 milliliters and equipped for agitation and heating were placed 180 milliliters of qb 11 per cent, by weight, aqueous gelatin solution (the same kind of gelatin as specified in Example 1, above), qb 180 milliliters of 11 per cent, by weight gum solution, 800 milliliters of warmed water (about 55 degrees centigrade), and qb 80 milliliters of qb 2 per cent, by weight, aqueous solution of a mixture of sodium-hydroxide-neutralized copolymers of ethylene and maleic anhydride (a one-to-one, by weight, ratio of q37 EMA-21" and "EMA-31". which are poly(ethylene-co-maleic anhydride) materials having molecular weights of about 6,000 and qb 60,000 to qb 70,000, respectively, as sold by Monsanto Chemical Company, St. Louis Mi, United States of America The system was warmed to a temperature of about 50° C. and the pH was adjusted to 6.5 in order to cause optimum emergence of a capsule wall-forming separated liquid phase. To the agitating system, was then added 250 milliliters of toluene to serve as the capsule internal phase for this example. Agitation was adjusted to produce a dispersion of toluene particles having diameters of 1,000 to 1,500 microns. The agitating system was permitted to cool to a temperature of about 25° C. over a duration of about 2 hours, during which time the liquid capsule wall-forming phase enwrapped the toluene particles and gelled. The system, now including capsules, was chilled to a temperature of about 10° C. and the pH was adjusted to about 4.5 using 14 ql per cent, by weight, aqueous acetic acid solution. Ten milliliters of 25 percent, by weight, aqueous pentanedial (commonly named glutaraldehyde) solution was added to the system to chemically cross-link the capsule wall material and the system was agitated overnight (14 to 16 hours). The capsules, now having walls of chemically cross-linked material, were separated from the liquid in the system by centrifuging and the capsules were washed with water by immersion. About 100 grams of the resulting, moist and swollen capsules were dispersed in 450 milliliters of water and added to that dispersion were 200 milliliters of 5 per cent, by weight, aqueous resorcinol solution, 60 milliliters of 37 per cent, by weight, formaldehyde solution and 200 milliliters of 10 per cent, by weight, aqueous sulfuric acid solution. The final pH of the dispersion was about 2. ql After about qb 6 hours of agitating, during which time the condensation polymerization reaction proceeded throughout the capsule wall material, the capsules were separated from the liquid system, were washed several times by immersing them in water, and were spread onto an absorbent surface to dry in ambient laboratory conditions (about 25° C. and 50 per cent relative humidity). The treated capsule walls of this example exhibited no tendency to swell or immersion in water.

b. The treatment was repeated using the above-prepared, glutaraldehyde hardened, capsules whose walls had been dried to yield apparently dry, rigid-walled, capsules containing toluene. Into a vessel having a capacity of approximately 1,500 milliliters and equipped for agitation and heating were placed 47 grams of the capsules to be treated, 225 milliliters of chilled (0° to 5q20 C.) water, 200 ql milliliters of chilled 10 per cent, by weight aqueous sulfuric acid, 200 milliliters of chilled 5 per cent, by weight, aqueous hydroquinone solution and 60 milliliters of chilled 37 b per cent, by weight, formaldehyde solution. The system was agitated for about qb 6 ql hours while the temperature was permitted to rise to about 25° C. after which the system was agitated for an additional 14 to 16 hours in order to complete the condensation-polymerization reaction. The capsules were isolated by the same method as was utilized with the previously-treated capsules of part (a) of the example.

c. The treatment was repeated using dried capsules and the same materials in identical concentrations with those of part (b) above with the exception that 200 milliliters of chilled qb 5 per cent, by weight, aqueous catechol solution was used in place of the hydroquinone solution. The capsules were dried by the same method.

d. The capsules which were treated in this preparation were manufactured by the same procedure and technique and using the same materials as in part (a), above, with the exception that 330 milliliters of qb 2 ql per cent, by weight, aqueous ammonium vanadic (III) sulfate solution having a pH of 4.6 was added to the system simultaneously with the addition of the pentanedial solution. The ammonium vanadic (III) sulfate solution was utilized to more thoroughly cross-link the capsule wall material prior to the treatment of this invention. About 5 grams of the above-prepared capsules were dispersed in 50 milliliters of water to which was added 20 milliliters of 5 per cent, by weight, aqueous resorcinol solution followed, after 15 minutes, by 6 milliliters of 37 per cent, by weight, formaldehyde solution and 20 milliliters of 10 per cent, by weight, aqueous sulfuric acid solution. The dispersion was agitated for about 6 hours and the capsules were isolated and washed several times with water and were then spread onto an absorbent surface to dry in ambient laboratory conditions (about 25 degrees centigrade and about 50 per cent relative humidity). As in other examples of capsules treated by practice of this invention, the treated capsule walls of this example did not swell on immersion in water.

e. The capsules treated in this part (e) were prepared identically with the capsules of part (a), above, with the exception that 250 milliliters (420 grams) of tatrachlorotetrofluoropropane replaced toluene as the capsule internal phase material.

The capsules, when prepared, were washed with water which was then removed by decanting. The capsule slurry was diluted with water to a total volume of qb 2,500 milliliters and 1,000 milliliters of qb 5 per cent, by weight, aqueous resorcinol solution was added to the agitating system. After about 20 minutes, 300 milliliters of 37 per cent, by weight, formaldehyde solution were added, followed by sufficient 10 per cent, by weight, aqueous sulfuric acid solution to yield a pH of 1.1. ql The system was agitated at a temperature of about 25° C. for about 24 hours to assure completion of the condensation polymerization qpg,24 reaction and the capsules were then dried, as in previous examples, by spreading them on an absorbent surface.

Example 6

The capsules which were treated in this example and in the two examples following this one have poly(viny alcohol)-containing capsule wall material. Manufacture of the untreated capsules is, of course, not considered to be a part of the present invention it being taught and claimed in aforementioned United States Patent Application Ser. No. 701,128, now abandoned. For the sake of completeness of disclosure, the procedure for preparing the capsules having poly(viny alcohol)-containing walls will be included herein along with the procedure for the novel capsule wall treatment of this invention.

Into a Waring blender mixer cup having a capacity of about one-liter were placed 60 milliliters of dioctyl phthalate—the capsule internal phase for this example—, 150 milliliters of 5 per cent, by weight, aqueous poly(vinyl alcohol) solutiok. The poly(vinyl alcohol) solution was prepared as follows: 1.5 grams of about qb 86,000-molecular weight poly(vinyl alcohol) characterized by having a viscosity of about 26 to about 32 centipoises in a 4 per cent, by weight, aqueous solution at 20 degrees centigrade, and by being 99 to qb 100 per cent hydrolyzed (such as the material designated as q37 Elvanol 71-30" sold by E. I. duPont de Nemours and Co., Wilmington Del. United States of America and 3.0 grams of about 125,000-molecular weight poly(viny alcohol) characterized by having a viscosity of about 35 to 45 centipoises in a 4 per cent, by weight, aqueous solution at qb 20 degrees centigrade and by being 87 to 89 per cent hydrolyzed (such as the material designated as "Elvanol 50-42"q0 sold by E.I. duPont de Nemours and Co., Wilmington Del., United States of Americal) were dissolved in enough water to yield a total volume of 150 milliliters of solution. The mixer was operated for about 10 ql minutes to produce dispersed particles of dioctyl phthalate having diameters of 5 to qb 15 microns and the contents of the mixer cup were transferred to a vessel having a capacity of about 1500 milliliters and equipped for agitation and heating. Agitation was initiated to maintain the dispersion. The mixer cup was rinsed with 200 milliters of warmed (qb 55q20 C.) water which rinse water was also added to the vessel. Two hundred milliliters of 5 per cent, by weight, aqueous resorcinol solution was added and the agitated system was warmed to a temperature of about 45° C. The heat source was turned off and 50 milliliters of 5 per cent, by weight, aqueous sodium sulfate solution was added in a dropwise fashion while the system was cooling. When a temperature of about 25 degrees centigrade was reached. 100 milliliters of 10 per cent, by weight, aqueous urea solution was added to serve as an anti-aggregation agent for the now-formed capsules. The system was chilled to a temperature below 15 degrees centigrade and 60 milliliters of 37 per cent, by weight, formaldehyde solution was added, followed by sufficient 10 per cent, by weight, aqueous sulfuric acid solution to result in a pH below 2. ql The system was agitated overnight ( 14 to 16 hours) during which time the temperature of the system gradually rose to about room temperature (25 ° C.). The treated capsules were isolated from liquid in the system by decanting; the capsules were washed several times by immersing them in water; and the capsule walls were dried by spreading the capsules onto an absorbent surface in ambient laboratory conditions (about qb 25 degrees centigrade and 50 per cent relative humidity). As was the case with treated gelatin-walled capsules, the treated poly(vinyl alcohol)-walled capsules off this example did not swell on immersion in water.

Example 7

A dispersion of dioctyl phthalate particles in aqueous poly(viny alcohol) solution was prepared by the same procedure and using the same kinds of materials as were specified in Example 6, above, and the dispersion was transferred to a vessel having a capacity of 1500 ql milliliters and equipped for agitation and heating. Agitation was initiated to maintain the dispersion. Two hundred milliliters of 11 per cent, by weight, aqueous gum arabic solution was added to the agitating system as were 400 milliliters of water which had been used to rinse the blender cup. The system was cooled to a temperature of about 15 degrees centigrade and qb 200 ql milliliters of aqueous solution containing 10 grams of resorcinol, 1 gram of gallic acid, and 4 grams of urea were added. The urea was utilized to serve as an anti-aggregation agent for the capsules. One hundred milliliters of 2 per cent, by weight, aqueous sodium sulfate solution was added to the system to cause liquid-liquid phase separation of the poly(vinyl alcohol)/resorcinol/gallic acid complex and formation of capsule walls about the dispersed particles of diocyty phthalate. Sixth milliliters of 37 per cent, by weight, formaldehyde solution followed by 100 milliliters of 10 per cent, by weight, aqueous solution of sulfuric acid were added to the system and the system was agitated for 2 hours at a temperature of about qb 15 degrees centigrade and for about 14 to 16 hours at a temperature of about 25q20 q0 C. The resultant, treated, capsules were dried by the same technique as was used in the previous examples.

Example 8

In this example, capsules containing tetrachloroethylene and having poly(vinyl alcohol)-containing capsule wall material were treated by the condensation-polymerization process of this invention. Four hundred milliliters (640 grams) of tetrachloroethylene as the internal phase were dispersed into particles having diameters of 100 to 400 microns in a liquid system of: 300 milliliters of 5 per cent, by weight, aqueous solution of the poly(viny alcohol) material designated in Example qb 6, above, as "Elvanol 71-30"; 460 milliliters of 5 per cent, by weight, aqueous solution of the poly(vinyl alcohol) material designated in Example 6, above, as "Elvanol 50-qb 42"; and 906 milliliters of 11 per cent, by weight, aqueous gum arabic solution to effect phase separation of the poly(vinyl alcohol). The gum arabic solution also contained 0.7 per cent, by weight, of gum guar to modify the viscosity characteristics of the system and to provide for adequate suspension of the relatively dense capsule internal phase. Then, 850 milliliters of 6 per cent, by weight, aqueous resorcinol solution, 200 milliliters of 10 per cent, by weight, aqueous sulfuric acid solution, and 200 milliliters of 37 per cent, by weight, formaldehyde solution were added, in the order named and in a dropwise fashion. The agitating system was warmed to a temperature of about qb 45° C. and maintained at that temperature for about 1 hour, after which the temperature was permitted to gradually decrease, over a duration of 13 to qb 20 hours, to a temperature of about 25° C. The capsule walls were dried by the methods used in previous examples and the resulting treated capsule walls had substantially the same desirably physical characteristics as treated poly(viny alcohol)-walled capsules of previous examples.

Example 9

In this example, four different batches of capsules were prepared and treated to have capsule walls of poly(viny alcohol) and either hydroquinone, catechol, or phloroglucinol as the polyhydroxy aromatic material.

a. A dispersion was prepared consisting of 100 milliliters of toluene in a liquid system of: 20 milliliters of 5 per cent, by weight, aqueous solution of poly(vinyl alcohol) of the type previously specified as "Elvanol 71-30"; 180 qilliliters of 5 per cent, by weight, aqueous solution of poly(vinyl alcohol) of the type previously specified as q37 Elvanol 50-42"; 100 milliliters of water; and 200 milliliters of 11 per cent, by weight, aqueous gum arabic solution. One-hundred fifty milliliters of 5 per cent, by weight aqueous hydroquinone solution was added in dropwise fashion to the agitating system in order to form a complex of poly(viny alcohol) and hydroquinone. Then, qb 100 milliliters of 15 per cent, by weight, aqueous sodium sulfate was added in a dropwise fashion to promote liquid-liquid phase separation of the complex. The agitating system was heated to about 45° C. to enhance deposition of the phase-separated complex onto the toluene particles to form capsule walls and then 80 ql milliliters of 37 per cent, by weight, formaldehyde and 30 milliliters of concentrated sulfuric acid were slowly added to the system. The system was agitated overnight (14 to 16 hours) to permit complete condensation-polymerization between the hydroquinone and the formaldehyde.

b. This treatment was identical with part (a), above, with the exceptions that 150 milliliters of 5 per cent, by weight, aqueous catechol solution replaced the hydroquinone solution and 100 milliliters of 10 per cent, by weight, aqueous sulfiuric acid solution replaced the concentrated sulfuric acid.

c. This treatment was identical with (b), above, with the exception that 250 milliliters of 2 per cent, by weight, aqueous phloroglucinol solution replaced the catechol solution.

d. This treatment was identical with (c), above, with the exceptions that 80 milliliters of 30 per cent, by weight, aqueous glyoxal solution replaced the formaldehyde solution and an additional 15 milliliters of concentrated sulfuric acid was added with the sulfuric acid solution.

Example 10 qpp In this example, the capsules which were treated had walls of a poly(vinyl alcohol)/alkylene glycol borate ester complex and had been chemically cross-linked by means of a vanadyl sulfate hardening reaction. A procedure for manufacturing the capsules treated in this example is given in United States Paten Application Ser. No. 701,130, filed Jan. 29, 1968, ql and now U.S. Pat. No. 3,565,818, in the names of Robert G. Bayless and Donald D. Emrick, the same inventors as those herein, and assigned to the assignee herein. qp a. 21.6 grams of the above, dry-walled capsules were dispersed in 225 milliliters of chilled (0° to 5° C.) water to reswell the capsule walls and the following solutions were added in sequence: 60 milliliters 37 per cent, by weight, formaldehyde solution; and 200 milliliters of 5 per cent, by weight, aqueous resorcinol solution. The system was agitated for about 20 hours during which time the temperature was permitted to raise to about 25°q0 C. and the condensation polymerization within the capsule wall material was completed. The resulting capsules had reddish-brown walls which, after being dried, exhibited no tendency to reswell on immersion in water.

b. 22.0 grams of the dry-walled, poly(vinyl alcohol)/borate ester complex, capsules were dispersed in 150 milliliters of 15 per cent, by weight, aqueous sodium sulfate solution and qb 75 milliliters of water to reswell the capsule walls and the following were added in sequence: 200 milliliters of qb 5 per cent, by weight, aqueous phloroglucinol solution; and, after 20 minutes, 143 milliliters of 30 per cent, by weight, aqueous glyoxal solution and 57 milliliters of qb 15 ql per cent, by weight, sodium sulfate solution. The system was agitated for about qb 18 hours at a temperature of about 25 degrees centigrade during which time the condensation polymerization within the preformed capsule wall material was completed. The resulting capsule product had walls which exhibited no tendency to reswell on immersion in water.

Example 11

In this example, preformed capsule walls were made by causing liquid-liquid phase separation of an aqueous solution of methyl cellulose to be used as capsule wall material. A water soluble polymeric material derived from glucose was utilized as a phase-separation-inducing agent.

Fifteen milliliters of zylene—the capsule internal phase for this example—were dispersed as particles having diameters of 500to 1,000 microsn into 150 milliliters of 2.5 per cent, by weight, aqueous methyl cellulose solution. The methyl cellulose material used was characterized by having a viscosity of about 50 centipoises as measured in a 2 per cent, by weight, aqueous solution at a temperature of 20° C. and aby containing qb 28 to 30 per cent, by weight, methoxyl and 7 to 12 per cent, by weight, propylene-glycol-ether groups (such as the material designated as "60 HG" and sold by The Dow Chemical Co., Midland, Mi., United States of America Z To the dispersion of xylene particles was added, in a dropwise fashion, 45 milliliters of 25 per cent, by weight, aqueous solution of a polyglucoside sold by Vitamins, Inc. Chicago, Ill., United States of America under the name of "Dextran 34". The "Dextran 34" solution was utilized in this example to cause liquid-liquid phase separation. The dispersion was then warmed to a temperature of about 60° C to increase the viscosity of the separated phase. It should be noted that the methyl-cellulose capsule wall material used in this example exhibits an inverse temperature-solubility relationship. The capsules thusproduced had delicate walls too fragile for recovery from the liquid vehicle. To the warmed agitating dispersion of fragile-wailed capsules were added 20 milliliters of 20 per cent, by weight, aqueous resorcinol solution, 10 milliliters of 37 per cent, by weght, formaldehyde solution, and 25 milliliters of 10 ql per cent, by weight, aqueous sulfuric acid solution in that sequence and in a dropwise fashion. The warmed system was agitated for about 3 hours after which time the capsules were isolated and dried by the same methods used in previous examples. The reacted product of the condensation-polymeriztion treatment provided integrity and rigidity to the delicate capsule wall material and, moreover, the condensation polymerization occurred largely within the confines of the capsule walls because of the tendency for resorcinol to comple x with hydroxyl and ether chemical groups on the mathylcellulose molecules.

Example 12

This example utilized, as capsule wall material, a modified starch material having a positive electrical charge when dispersed in water.

Eight grams of trichlorobiphenyl—the capsule internal phase for this example—were dispersed to yield particles having diameters of 500 to 1,000 microns in a sol of 2 grams of cationic starch in 200 milliliters of water at a temperature of about 95° C. The cationic starch used was derived form corn starch modified to have a positive electrical charge by being reacted with a quaternary ammonium salt and had a viscosity of 105 ql centipoises as determined on a 2.9 per cent, by weight, aqueous solution at a temperature of 25° ql C. using a 20 revolution per-minute Brookfield spindle viscosimeter (such as the material designated as "Cationic Starch No. 3891" and sold by Corn Products Sales Co., New York, N.Y. United States of America The system was slowly cooled during which cationic starch capsule walls were formed about the particles of capsule internal phase material. While maintaining the agitation, sufficient 10 per cent, by weight, aqueous sulfuric acid was added to yield a pH of about 1.5. Two grams of resorcinol were dissolved in the dispersion and then 12 milliliters of 37 per cent, by weight, formaldehyde solution and an additional 50 milliliters of 10 per cent, by weight, aqueous sulfuric acid solution were added. The system was agitated for about 2 hours and the resulting, treated, capsules were isolated and dried by the same method as was used ik previous examples. The treated capsule walls of this example did not swell on immersion in water.

Example 13

This example and Example 14, following, were performed to demonstrate the novel process of this invention wherein the liquid system utilized in the capsule wall treatment has a pH higher than in previously disclosed examples. Ammonium- or amine-containing materials can be provided in order to successfully treat capsule wall materials by the process of this invention at a pH higher than about 3. Eligible ammonium compounds and amines to add to the polycondensation system include such materials as ammonium hydroxide, triethylenetetramine, ethylene diamine, and the like. Primary or secondary amines preferably are used in practicing this embodiment of the present invention.

Into a vessel having a capacity of approximately 2,000 milliliters and equipped for agitation and heating were placed 180 ql milliliters of 11 per cent, by weight, aqueous gelatin solution (the same kind of gelatin as was specified in Example qb 1, above), 180 milliliters of 11 per cent, by weight, aqueous gum arabic solution and 700 milliliters of water. Agitation was begun, the system was warmed to a temperature of about 40°q0 C. and the pH of the system was adjusted to 4.5 using 10 per cent, by weight, aqueous acetic acid. About 160 milliliters of toluene were then added to the agitating system to serve as the capsule internal phase for this example and the agitation was adjusted to yield particles of the toluene having diameters of about 100 to 1,000 microns. Liquid-liquid phase separation had occurred at the same time that the gelatin and gum arabic solutions were combined and the separated liquid phase which contained substantially all of the gelatin and gum arabic deposited ontothe dispersed particles of toluene on slowly cooling these system to a temperature of about 25° C. The agitating system, now containing capsules, was maintained at the temperature of 25° C. and 15 ql milliliters of 25 per cent, by weight, pentanedial was added and agitation was continued for about 30 ql minutes. Five grams of resorcinol was added to the agitating system and after about 10 minutes, when the resorcinol was completely dissolved, 100 milliliters of 1 per cent, by weight, aqueous triethylenetetrmaine solution was added to the system. Addition of the triethylenetetramine caused the pH of the system to increase to about 7.5. After continuing the agitation for about 30 minutes, the polycondensation had taken place and the treated capsules, separated from the liquid by filtering, were washed several times by immersing them in water. The capsule walls were dried by spreading the capsules onto an absorbent surface in ambient laboratory conditions (about 25° C. and about 50 per cent relative humidity). The treated capsule product of this example had capsule walls which exhibited only a very slight tendency to swell on immersion in water and are of some significant utility where some liquid permeability is required.

Example 14

This example was identical with Example 13 with the exception that the triethylenetetramine of Example 13 was replaced, in this example, by sufficient 15 per cent, by weight, aqueous ammonium hydroxide solution to yield a pH of the encapsulating system equal to about 9.5. The treated capsule product of this example was similar, in appearance and physical characteristics, to the capsule product of the preceding Example 13.

Example 15

In this example, capsules were prepared using kinds and concentrations of materials and capsule manufacturing techniques substantially identical with that of Example 5, preparation (a), above, with the exceptions that the pH at which the polycondensation was conducted was maintained at 6.5 and the temperatures was maintained at about 50 qpg,33 degrees centigrade. The capsule product of this example was substantially identical with the capsule product of Example 5.

Example 16

In this example, capsules were prepared using kinds and concentration of materials and capsule manufacturing techniques substantially identical with that of Example 6, above, with the exceptions that the pH at which the polycondensation was conducted was maintained at about 7 and the temperature was maintained at about 50° C. The capsule product of this example was substantially identical with the capsule product of Example 6.

Example 17

This example was performed to demonstrate the novel process of the present invention wherein commercially available methylated methylol melamine polymeric material is included as one component of the interstitial polymerizing reaction. several commercially available materials are eligible for use. The commercial melamine material of this example is sold under the trademark, "Resloom M-80", by Monsanto Chemical Co., St. Louis Mi., United States of America and has the following characteristics: (a) it is provided in 80 per cent, by weight, aqueous solution; (b) it comprises, generally, polymeric methylated methylol melamine wherein individual molecules have four to five melamine groups and wherein each melamine group contains, on the average, 3.25 methylol groups, 2.5 of which are methylated; and (c) it is relatively inert to polymerization at about pH 7–8 (25° C.).

Capsules for treatment in this example are made as follows: A mixture is prepared by emulsifying 37 ql grams of water, 68 grams of 11 per cent, by weight, aqueous gelatin solution and 95 milliliters of trichlorobiphenyl together in a high-speed blending device for about 10 minutes or until the resulting, dispersed, droplets of trichlorobiphenyl are about 2–5 microns in average diameter. The trichlorobiphenyl serves as capsule internal phase material for this example.

The above emulsion is added to an agitating solution of 6 ql grams of qb 5 per cent, by weight, poly(methylvinylether-co-maleic anhydride) (identified below), 45.5 grams of 11 per cent, by weight, gum arabic and 325 grams water, all maintained at about 55° C. and pH 9.0. The poly(methylvinylether-co-maleic anhydride) is, for example, a kind exhibiting a specific viscosity of 1.0 to 1.4 in 1 per cent, by weight, ethyl methyl ketone at k25° C. a softening point temperature of 200 to 225° C. a specific gravity of 1.37 and sold under the trademark "Gantrez AN" by General Aniline and Film Corporation, New York, N.Y., United States of America While maintaining the agitation, about 6.75 milliliters of 14 per cent, by weight, acetic acid are added to the system to adjust the pH to qb 4.6. At that time, coacervation has occurred and droplets of the internal phase have been enwrapped by liquid capsule wall material. The agitating system is slowly cooled to about room temperature and then chilled to about 10° C. to gel the capsule walls and, as an optional capsule wall cross-linking step, 3.75 milliliters of 25 per cent, by weight glutaraldehyde solution can be added.

To one liter of the above-prepared capsule-containing system are added 5 grams of urea; and after sufficient time for the urea to dissolve, about 20 milliliters of the above-identified "Resloom M-80"ql (trademark) is added followed by addition of qb 30 milliliters of 37 per cent, by weight, aqueous formaldehyde solution. The preferred pH for the system up to this point is about 9–10, bu pH's of 3.5 to about qb 10 can be used. The pH is adjusted to about 5–7 ql and 50 milliliters of 12 per cent, by weight, aqueous resorcinol solution is added to the system which is maintained under agitation at about 25° C. for about 13 hours to complete the interstitial polymerization within the preformed capsule wall material.

Example 18

In this example, capsules as prepared in Example 17 are used for the interstitial polycondensation capsule wall treatment. The process of this example is substantially identical with that of Example 17 with the exception that the formaldehyde solution is replaced by an equal amount of the methylated methylol melamine solution. qpg,35

It should be pointed out that the polycondensation of the prior two examples occurs within the confines of the preformed capsule wall material due to the tendency, not only for the resorcinol to complex and concentrate within the capsule wall material, but also due to the attraction of the melamine methylol material for the capsule wall material.

WHAT IS CLAIMED IS:

1. A process for treating existing walls of hydrophilic, polymeric material, en masse, comprising the steps of:
   a. establising an agitated aqueous liquid system having dispersed therein capsules having liquid-permeated walls of hydrophilic polymeric film-forming material; qp1 b. adding to the system, a water-soluble phenolic material reactant, said reactant having at least one phenolic hydroxy group, which material is sorbed into the polymeric film-forming capsule wall material; and
   c. infusing, into the polymeric film-forming material of step (b), an aldehydic material selected from the group consisting of formaldehyde, glyoxal, furfural, and glutaraldehyde which aldehydic material reacts, within the capsule wall material, with the phenolic material to provide hydrophobic polymeric material capsule walls.

2. The process of claim 1 wherein water-soluble phenolic material is at least one material selected from the group of materials consisting of: resorcinol, catechol, phloroglucinol and hydroquinone.

3. A process for treating existing hydrophillic, capsule walls of hydrophllic polymeric material, en masse, comprising the steps of:
   a. concentrating a water-ssluble phenolic material, said material having at least one phenolic hydroxy group, within liquid-permeated, hydrophillic, capsule wall material of capsules dispersed in an agitated aqueous liquid system;
   b. adding to the system, an aldehydic material selected from the group consisting of formaldehyde, gloxal, furfural, and glutaraldehyde which aldehydic material reacts with the phenolic material to form a condensate which provides rigidity and hydrophobicity to the capsule walls.

4. The process of claim 3 wherein the water-soluble phenolic material is at least one material selected from the group of materials consisting of: resorcinol, catechol, phloroglucinol, and hydroquinone.

5. In a mixture substantially spherical capsule having walls of polymeric material, the improvement wherein the polymeric material forming the wall consists of an intimate intersprersed association of a hydrophilic polymeric material and a hydrophobic polymeric material product of a polycondensation reaction between a water-soluble phenolic material reactant, said reactant having at least one phenolic hydroxy group, and a reactant selected from the group of aldehydic material consisting of formaldehyde, glyoxal, furfuraly, and glutaraldehyde.

6. In a process for treating existing capsule walls of hydrophilic polymeric material, en masse, comprising the steps of: dispersing capsules whose walls are to be treated in an agitated liquid system which system swells the capsule wall material and has, in solution a first reactant of two reactants, which first reactant infuses into the capsule wall material and is thereto bound, and adding to the agitated system the second reactant which reactant reacts with the first reactant to yield a hydrophobic polymeric material in intimate bound association with the capsule wall material to render the capsule walls hydrophobic; the improvement wherein the first polymerizable reactant is a water-soluble phenolic material, said material having at least one phenolic hydroxy group, and the second polymerizable reactant is an aldehydic material selected from the group consisting of formaldehyde, glyoxal, furfural, and glutaraldehyde.

* * * * *

UNITED STATES PATENT OFFICE
CERTIFICATE OF CORRECTION

Patent No. 3,726,803          Dated April 10, 1973

Inventor(s)  Robert G. Bayless et al.

It is certified that error appears in the above-identified patent and that said Letters Patent are hereby corrected as shown below:

Column 2, line 62, "polybydric" should read -- polyhydric --; column 3, line 26, "distince" should read -- distinct --; line 50, "enn" should read -- en --. Columns 5 thru 22 should be canceled and the attached columns substituted therefor.

Signed and sealed this 6th day of November 1973.

(SEAL)
Attest:

EDWARD M. FLETCHER, JR.          RENE D. TEGTMEYER
Attesting Officer                Acting Commissioner of Patents